(12) United States Patent
Giordano et al.

(10) Patent No.: US 11,003,425 B2
(45) Date of Patent: May 11, 2021

(54) MIXED CRITICALITY USER INTERFACE DEVELOPMENT SYSTEM

(71) Applicant: Disti, LLC, Orlando, FL (US)

(72) Inventors: Christopher P Giordano, Orlando, FL (US); Christopher G Van Duyne, Orlando, FL (US); Scott A VanderWeide, Orlando, FL (US); Nathan Giroux, Orlando, FL (US)

(73) Assignee: Disti, LLC, Orlando, FL (US)

( * ) Notice: Subject to any disclaimer, the term of this patent is extended or adjusted under 35 U.S.C. 154(b) by 58 days.

(21) Appl. No.: 16/698,089

(22) Filed: Nov. 27, 2019

(65) Prior Publication Data

US 2020/0225918 A1    Jul. 16, 2020

Related U.S. Application Data

(60) Provisional application No. 62/790,508, filed on Jan. 10, 2019.

(51) Int. Cl.
  *G06F 9/44* (2018.01)
  *G06F 8/38* (2018.01)
  *G06F 8/34* (2018.01)

(52) U.S. Cl.
  CPC . *G06F 8/38* (2013.01); *G06F 8/34* (2013.01)

(58) Field of Classification Search
  None
  See application file for complete search history.

(56) References Cited

U.S. PATENT DOCUMENTS

| | | | |
|---|---|---|---|
| 7,467,198 B2 * | 12/2008 | Goodman | G06Q 10/10 709/223 |
| 10,360,000 B2 * | 7/2019 | Hanna | G06F 8/36 |
| 2005/0265596 A1 * | 12/2005 | Lohmann | G01S 17/08 382/153 |
| 2016/0292895 A1 | 10/2016 | Billi et al. | |
| 2017/0083290 A1 | 3/2017 | Bharthulwar | |
| 2017/0137093 A1 * | 5/2017 | White | B63B 23/02 |
| 2018/0165814 A1 | 6/2018 | Gulati et al. | |
| 2020/0233418 A1 * | 7/2020 | Liu | G05D 1/0212 |

OTHER PUBLICATIONS

Ollila, "Functional Safety with Qt and Qt Safe Renderer" 2018 Q I Presentation. Oct. 15, 2018 [Retrieved Mar. 6, 2020].
CAN, "Micro-controllers dedicated for Functional Safety" Jan. 2011 CAN Newsletter, Jan. 31, 2011 [Retrieved Mar. 6, 2020].
Gu, "Safety-Related Component for CNC System: A Case of Funcational Safety in Software Application" Intl Conf. on Info. & Automatio, China, Aug. 31, 2018 [Retrieved Mar. 6, 2020].

* cited by examiner

*Primary Examiner* — Anna C Deng

(57) ABSTRACT

A method for mixed criticality user interface development includes storing at least one set of safety critical requirements along with a corresponding safety critical designation and designating an object according to the safety critical designation for deployment along with other objects in a user interface. The method further includes responding to an end user executing a request to deploy the user interface by automatically decomposing the user interface into a safety critical layer including the designated objects and a non-safety critical layer including the other objects, building the critical safety layer according to the set of safety critical requirements of the safety critical designation of the object, building the non-safety critical layer and deploying the critical safety layer and the non-safety critical layer as an overlay view in the user interface.

15 Claims, 2 Drawing Sheets

MIXED CRITICALITY USER INTERFACE DEVELOPMENT SYSTEM

CROSS-REFERENCE TO RELATED APPLICATIONS

This application claims the benefit of U.S. Provisional Application No. 62/790,508, filed Jan. 10, 2019, the entirety of which is incorporated herein by reference.

BACKGROUND OF THE INVENTION

Field of the Invention

The present invention relates to user interface development systems and more particularly to user interface development systems with safety critical content.

Description of the Related Art

Numerous industry standards define safety critical support in connection with developing software tools and system. These standards include IEC 61508 (electrical/electronic systems), ISO 26262 (road vehicles), IEC 62304 (medical devices), EN 50128 (railway systems), DO-178B/C or ED-12B/C (avionics systems). As such, safety critical content requires additional support from software tools and systems in the form of processing capabilities, backup systems, failure analysis, etc. in order to meet the requirements of the safety critical standards before the safety critical content can be deployed.

DiSTI's GL Studio® allows for the easy creation of user interfaces compliant with target hardware. GL Studio® can be used to deliver digital automotive cockpit instruments, HUDs, controls and clusters, and fully immersive HMI cockpit environments quickly and easily. DiSTI's GL Studio® provides high performance and high quality visuals from the Embedded Systems user interface design when designing non-safety critical components. Separately, DiSTI's GL Studio® provides safety critical content support for safety critical user interface design.

Customers now have the need to develop both non-safety critical and safety critical components within the same system. However, the process to develop a system that includes safety critical and non-safety critical content is extremely onerous. Currently, the end user must either design the safety critical content separate from the non-safety critical content or design the non-safety critical content according to the safety critical requirements, which would preclude the end user from using many of the high performance and high quality visuals provided by DiSTI's GL Studio®.

BRIEF SUMMARY OF THE INVENTION

Embodiments of the present invention address deficiencies of the art in respect to user interface development systems with safety critical content and provide a novel and non-obvious method, system and computer program product for mixed criticality user interface development. In an embodiment of the invention, a method for mixed criticality user interface development includes storing at least one set of safety critical requirements and a corresponding safety critical designation for each set of safety critical requirements and designating an object according to a one of the corresponding safety critical designations for deployment along with other objects in a user interface. The method further includes response to an end user executing a request to build and deploy the user interface, automatically executing a script to decompose the user interface into a safety critical layer for the user interface including the designated ones of the objects and a non-safety critical layer for the user interface including the other objects, building the safety critical layer according to the set of safety critical requirements of the corresponding safety critical designation of the object, building the non-safety critical layer and deploying the safety critical layer and the non-safety critical layer as an overlay view in the user interface.

In one aspect of the embodiment, different objects are given different safety critical designations, the pre-generation script decomposes the user interface into a different safety critical layer for the different safety critical designation, the different safety critical layer is built according to the set of safety critical requirements and the different safety critical layer is deployed in the overlay view. In another aspect of the embodiment, the method further includes deploying the safety critical layer and the non-safety critical layer in the user interface as separate composite views in the user interface, wherein the non-safety critical layer is beneath the safety critical layer. In yet another aspect of the embodiment, the set of safety critical requirements includes an improvement in the minimum runtime processing speed for the building of the safety critical objects. In even yet another aspect of the embodiment, the method further including editing the overlay view in the user interface and iterating the response to the request to build and deploy the user interface until a final user interface design is completed.

In another embodiment of the invention, data processing system may be configured for mixed criticality user interface development. The system includes a host computing system including one or more computers each with memory and at least one processor and a user interface development application executing in memory of the host computing system. A mixed criticality development module is coupled to the user interface development application and the module includes program code enabled to store at least one set of safety critical requirements and a corresponding safety critical designation for each set of safety critical requirements and to designate an object according to a one of the corresponding safety critical designations for deployment along with other objects in a user interface. The program code is further enabled to respond to an end user executing a request to build and deploy the user interface by automatically executing a script to decompose the user interface into a safety critical layer for the user interface including the designated ones of the objects and a non-safety critical layer for the user interface including the other objects, building the safety critical layer according to the set of safety critical requirements of the corresponding safety critical designation of the object, building the non-safety critical layer, and deploying the safety critical layer and the non-safety critical layer as an overlay view in the user interface.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for mixed criticality user interface development by allowing end users to designate objects as safety critical for deployment along with other objects in a single view of the user interface design. By allowing the end user to design the safety critical objects and non-safety critical objects in the single view of the user interface, the end user is able to more efficiently visualize how all of the objects will run and interact in the user interface once installed on the target hardware. When the end user builds and deploys the user interface, the single view of the user interface is decomposed into a safety critical layer that includes the designated safety critical objects and a main or non-safety critical layer that includes the non-safety critical objects. The safety critical layer is prioritized and built according to the safety critical requirements and deployed overlaying the main layer that is built without the need for the safety critical requirements. The end user may then iterate the process by editing the single view of the overlaid safety critical layer and main layer before installing the user interface design on the target hardware. Thus, the efficiency of the user interface design system is optimized as the end user is able to design all of the safety-critical and non-safety critical components in a single view of the user interface design throughout the design process.

Figure 1:
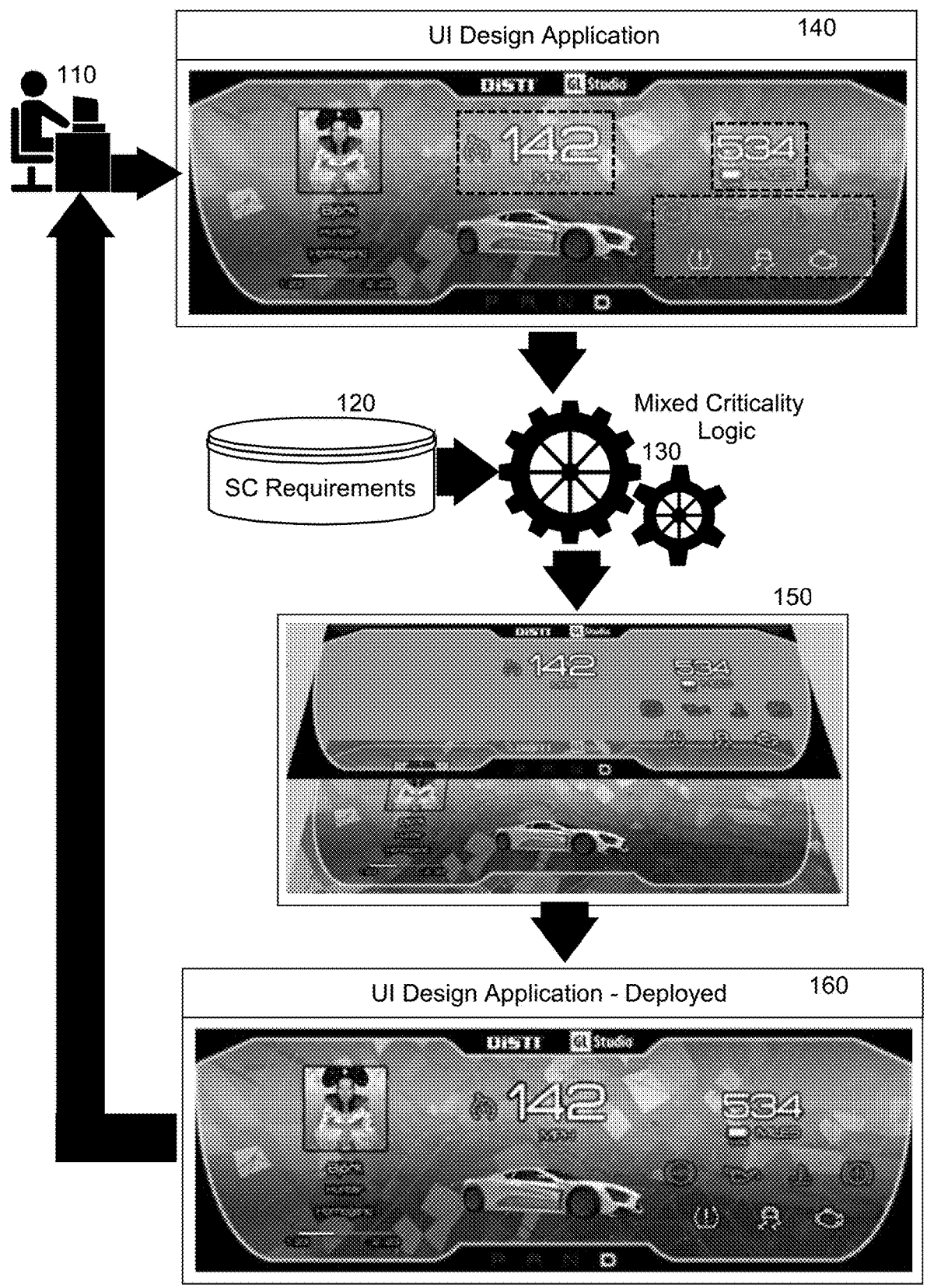
FIG. 1 is a pictorial illustration of a process for mixed criticality user interface development.

In further illustration, FIG. 1 pictorially shows a process for mixed criticality user interface development. As shown in FIG. 1, end user 110 starts a new project in a user interface design application 140 and adds the mixed criticality logic or package 130 to the design project. During development, the user interface developer or end user 110 develops an integrated user interface including both safety critical and non-safety critical components. The developer may position, resize, etc. each of the components to develop a user interface with the desired look. Notably, as can be seen in the user interface design application 140, the user is able to define which objects in the single view of the user interface design are designated as safety critical that require separate safety critical requirements 120. The end user is able to designate different objects under different safety critical designations that have different safety critical requirements in the single view of the user interface design 140.

Safety critical requirements 120 are based on safety critical standards, such as IEC 61508 (electrical/electronic systems), ISO 26262 (road vehicles), IEC 62304 (medical devices), EN 50128 (railway systems), DO-178B/C or ED-12B/C (avionics systems). The safety critical requirements may be stored in the form of packages that provide additional support to the user interface design tools to support requirements of processing capabilities, such as minimum runtime processing speed, backup systems, failure analysis, etc. of the different safety critical standards.

Once the components are positioned as desired, the system may build and deploy the design of the user interface, which generates, compiles, links, and runs one or more appropriate applications to demonstrate a functional model of the user interface. As can be seen from FIG. 1, when the user builds and deploys the user interface design application 140, mixed criticality logic 130 decomposes the single view of the design 140 into separate layers 150. The separate layers 150 include a safety critical layer and non-safety critical layer or main layer. The safety critical layer includes all of the objects designated as safety critical in the user interface design 140. Alternatively, mixed criticality logic 130 may decompose user interface design 140 into multiple safety critical layers, where each safety critical layer is decomposed based on different safety critical designations of different objects having different safety critical requirements.

The safety critical layer is then prioritized and built according to the safety critical requirements 120 of the safety critical designation of the objects as shown in 150. The non-safety critical layer is built without regard to the safety critical requirements and can therefore include higher quality and high performance visuals as shown in 150. The safety critical layer may be prioritized, so that the non-safety critical layer is built subsequent to the safety critical layer. The safety critical layer and non-safety critical are then overlaid to display a single overlaid view 160 of the safety critical layer and non-safety critical layer. The single overlaid view 160 is then displayed to the end user in the UI design application, so that the end user can iterate the design process and efficiently determine how the safety critical objects and non-safety critical objects interact.

The developer or end user 110 iterates through changes and modifications, rebuilding and testing, until a final design of the user interface is created. At that stage, the system can deploy the interface to the target hardware, such as an automobile, airplane, or any other system or vehicle. Additionally, the end user may also execute a request to view the decomposed safety critical layers and non-safety critical layers as separate composite views in the UI design application to work on the layers separately. Furthermore, the end user may build and deploy these user interface design application 160 to both desktop PCs (like Windows and Linux) for ease of design of the user interface and directly to embedded target systems to determine how the user interface will run on the actual embedded target system.

Figure 2:
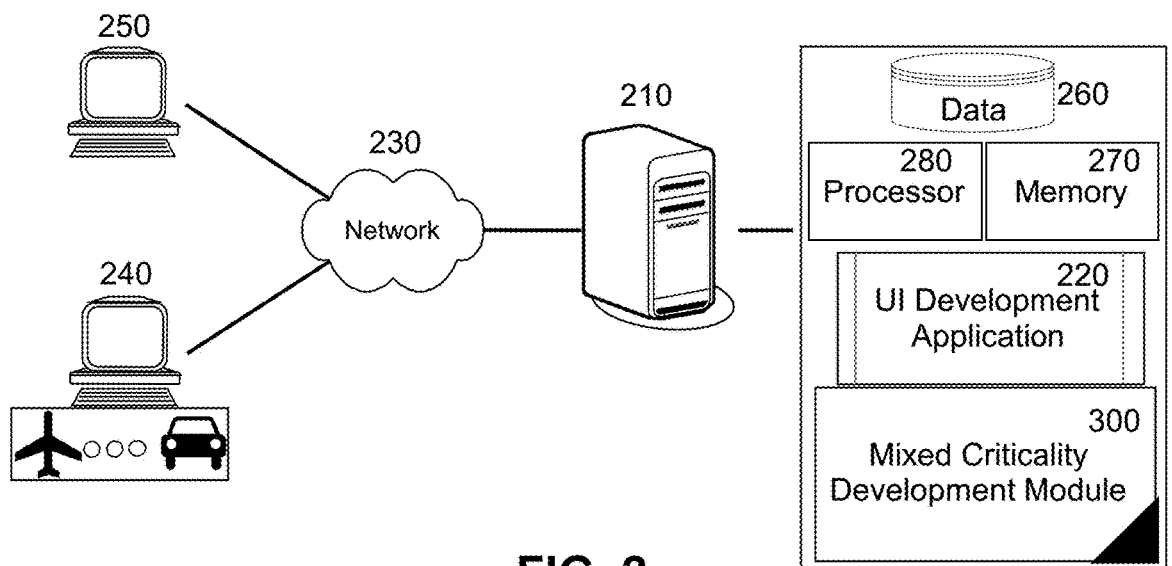
FIG. 2 is a schematic illustration of a data processing system adapted for mixed criticality user interface development; and, FIG. 3 is a flow chart illustrating a process for mixed criticality user interface development.

The process shown in FIG. 1 may be implemented in a computer data processing system. In further illustration, FIG. 2 schematically shows a data processing system adapted for mixed criticality user interface development. The system communicates over a network 210 with a server 220 and the system includes at least one processor 280 and memory 270 and fixed storage 260 disposed within the system. The system includes a user interface development application 220 for developing and designing user interfaces for deployment in target system 240, such as an automobile, airplane, or any other system or vehicle or in different devices 250, such as desktop PCs, laptops or mobile devices, for different end users of the user interface design and development application 220.

Importantly, the mixed criticality development module 300 may be coupled to the user interface design application

220. Mixed criticality development module 300 stores sets of safety critical requirements and corresponding safety critical designation for each set of safety critical requirements in fixed storage 260. An end user of device 250 or target system 240 develops a user interface for deployment on device 250 or target system 240 and designates an object according to a one of the corresponding safety critical designations for deployment along with other objects in a user interface. When the end user builds and deploys the user interface, mixed criticality development module 300 decomposes the user interface into a safety critical layer for the user interface including the designated ones of the objects and a non-safety critical layer for the user interface including the other objects. Mixed criticality development module 300 then prioritizes and builds the safety critical layer according to the set of safety critical requirements of the corresponding safety critical designation of the object and builds the non-safety critical layer without regard to safety critical requirements. As each layer is built, the layers are deployed as a single overlaid view in device 250 or target system 240, so that the end user can iterate the process until a final design is created and deployed on the target system 240.

Figure 3:
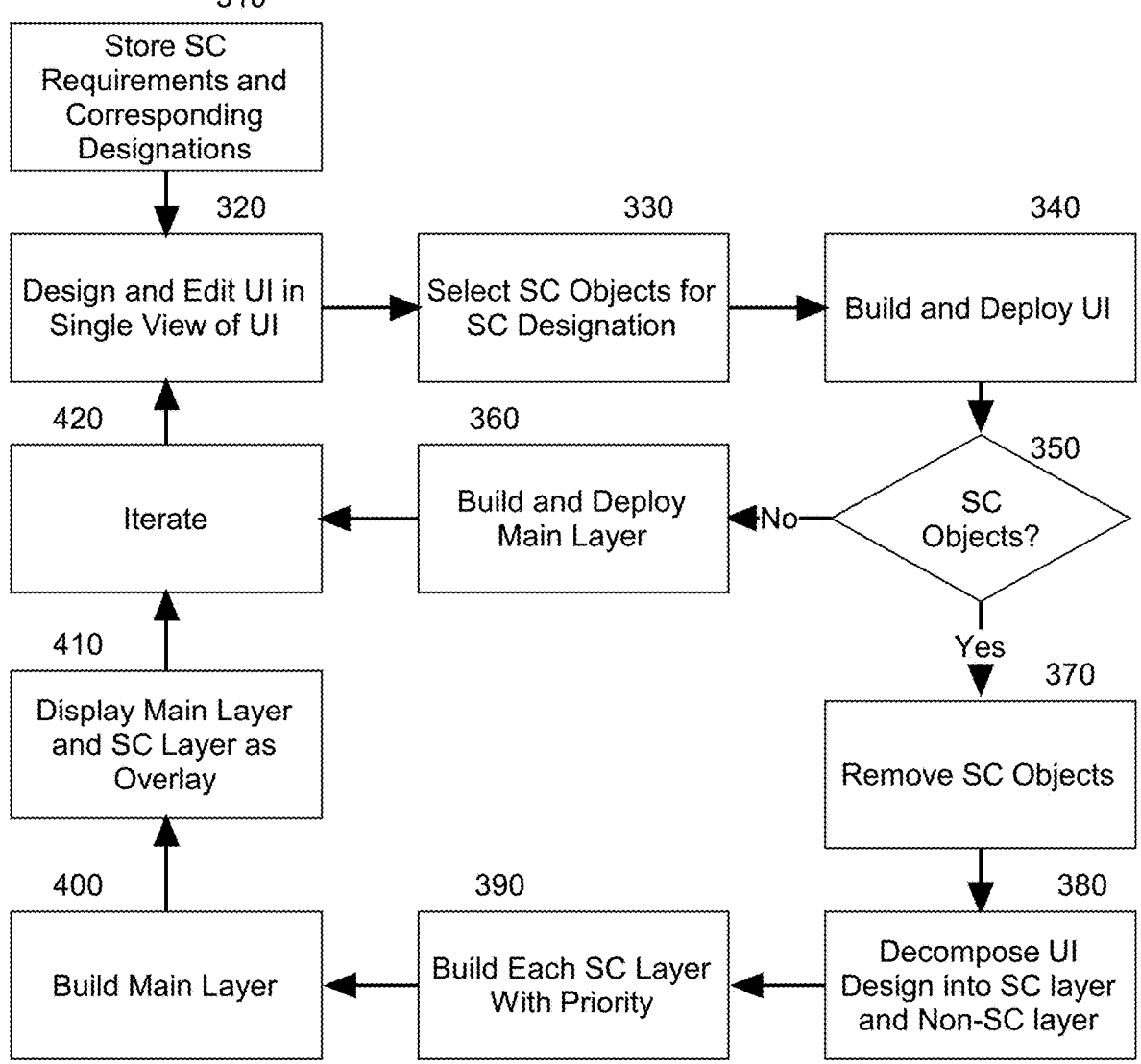

In even yet further illustration of the operation of the mixed criticality development module 300, FIG. 3 is a flow chart illustrating an exemplary process for mixed criticality user interface development. Beginning in block 310, different safety critical requirements and corresponding safety critical designations are stored. In block 320, an end user designs and edits a user interface design in a single view of the user interface design. In block 330, the end user selects the objects in the user interface design that are safety critical with one of the corresponding safety critical designations for deployment with other objects in the user interface design. In block 340, the end user builds and deploys the user interface design. In block 350, it is determined if are safety critical objects in the user interface design. If there are no safety critical objects, in block 360, the user interface is built and deployed as a single main layer, so that the end user may edit the design and iterate the process in block 420 until the design is completed.

If there are safety critical objects present in the user interface design, in block 370, the safety critical objects are removed from the main layer and, in block 380, the single view of the user interface design is decomposed into a main layer and safety critical layer. In block 390, the safety critical layer is prioritized and built according to the safety critical requirements of the safety critical designation of the objects of the safety critical layer. There may be multiple safety critical layers based on different objects with different safety critical designations. In block 400, the main layer is built without regard to the safety critical requirements of the safety critical layer. In block 410, a single overlay view of the safety critical layer and main layer is displayed to the end user, so that the end user can edit the user interface design and iterate the process in block 420 until a final design is completed.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for mixed criticality user interface development comprising:
    storing at least one set of safety critical requirements and a corresponding safety critical designation for each of the at least one set of safety critical requirements, wherein the at least one set of safety critical requirements comprises a software package for providing safety critical support for a specific target computing system;
    designating an object according to a set of the at least one set of the corresponding safety critical designations for deployment along with other objects in a user interface;
    responding to an end user executing a request to build and deploy the user interface:
        automatically executing a script to decompose the user interface into a safety critical layer for the user interface comprising the designated object and a non-safety critical layer for the user interface comprising the other objects,
        building the safety critical layer according to the set of safety critical requirements of the corresponding safety critical designation of the object, building the non-safety critical layer for the other objects in the user interface, and,
        deploying the safety critical layer and the non-safety critical layer as an overlay view in the user interface.

2. The method according to claim 1, wherein a different object is designated according to a different safety critical designation, a pre-generation script decomposes the user interface into a different safety critical layer for the different safety critical designation, the different safety critical layer is built according to a different set of safety critical requirements and the different safety critical layer is deployed in the overlay view.

3. The method according to claim 1, further comprising:
    further deploying the safety critical layer and the non-safety critical layer in the user interface as separate composite views in the user interface, wherein the non-safety critical layer is beneath the safety critical layer.

4. The method according to claim 1, wherein the software package comprises a minimum runtime processing speed for building safety critical objects.

5. The method according to claim 1, further comprising:
    editing the overlay view in the user interface; and,
    iterating the responding to the request to build and deploy the user interface until a final user interface design is completed.

6. A data processing system configured for mixed criticality user interface development, the system comprising:
    a host computing system comprising one or more computers each with a memory and at least one processor;
    a user interface development application executing in the memory of the host computing system; and,
    a mixed criticality development module coupled to the user interface development application, the mixed critically development module comprising program code enabled to:
    store at least one set of safety critical requirements and a corresponding safety critical designation for each of the at least one set of safety critical requirements, wherein the at least one set of safety critical requirements comprises a software package for providing safety critical support for a specific target computing system,
    designate an object according to a set of the at least one set of the corresponding safety critical designations for deployment along with other objects in a user interface, and
    respond to an end user executing a request to build and deploy the user interface by:
    automatically executing a script to decompose the user interface into a safety critical layer for the user interface comprising the designated object and a non-safety critical layer for the user interface comprising the other objects,
    building the safety critical layer according to the set of safety critical requirements of the corresponding safety critical designation of the object, building the non-safety critical layer for the other objects in the user interface, and
    deploying the safety critical layer and the non-safety critical layer as an overlay view in the user interface.

7. The system of claim 6, wherein a different object is designated according to a different safety critical designation, a pre-generation script decomposes the user interface into a different safety critical layer for the different safety critical designation, the different safety critical layer is built according to a different set of safety critical requirements and the different safety critical layer is deployed in the overlay view.

8. The system of claim 6, wherein the program code is further enabled to further deploy the safety critical layer and the non-safety critical layer in the user interface as separate composite views in the user interface, wherein the non-safety critical layer is beneath the safety critical layer.

9. The system of claim 6, wherein the software package comprises a minimum runtime processing speed for building safety critical objects.

10. The system of claim 6, wherein the program code is further enabled to edit the overlay view in the user interface and to iterate the respond to the request to build and deploy the user interface until a final user interface design is completed.

11. A computer program product for mixed criticality user interface development, the computer program product including a non-transitory computer readable storage medium having program instructions embodied therewith, the program instructions executable by a device to cause the device to perform a method including:
   storing at least one set of safety critical requirements and a corresponding safety critical designation for each of the at least one set of safety critical requirements, wherein the at least one set of safety critical requirements comprises a software package for providing safety critical support for a specific target computing system;
   designating an object according to a set of the at least one set of the corresponding safety critical designations for deployment along with other objects in a user interface;
   responding to an end user executing a request to build and deploy the user interface:
   automatically executing a script to decompose the user interface into a safety critical layer for the user interface comprising the designated object and a non-safety critical layer for the user interface comprising the other objects,
   building the safety critical layer according to the set of safety critical requirements of the corresponding safety critical designation of the object, building the non-safety critical layer for the other objects in the user interface, and,
   deploying the safety critical layer and the non-safety critical layer as an overlay view in the user interface.

12. The computer program product of claim 11, wherein a different object designated according to a different safety critical designation, a pre-generation script decomposes the user interface into a different safety critical layer for the different safety critical designation, the different safety critical layer is built according to a different set of safety critical requirements and the different safety critical layer is deployed in the overlay view.

13. The computer program product of claim 11, wherein the method further comprises:
   further deploying the safety critical layer and the non-safety critical layer in the user interface as separate composite views in the user interface, wherein the non-safety critical layer is beneath the safety critical layer.

14. The computer program product of claim 11, wherein the software package comprises a minimum runtime processing speed for building safety critical objects.

15. The computer program product of claim 11, further comprising:
   editing the overlay view in the user interface; and,
   iterating the responding to the request to build and deploy the user interface until a final user interface design is completed.

* * * * *